(12) United States Patent
Paul et al.

(10) Patent No.: US 11,769,085 B2
(45) Date of Patent: Sep. 26, 2023

(54) SYSTEM AND METHOD FOR REAL TIME PREDICTION OF WATER LEVEL AND HAZARD LEVEL OF A DAM

(71) Applicant: UNIVERSITY OF JOHANNESBURG, Johannesburg (ZA)

(72) Inventors: Dipanjan Paul, West Bengal (IN); Marwala Tshilidzi, Johannesburg (ZA); Satyakama Paul, West Bengal (IN)

(73) Assignee: UNIVERSITY OF JOHANNESBURG, Johannesburg (ZA)

( * ) Notice: Subject to any disclaimer, the term of this patent is extended or adjusted under 35 U.S.C. 154(b) by 518 days.

(21) Appl. No.: 17/058,189

(22) PCT Filed: May 22, 2019

(86) PCT No.: PCT/IB2019/054228
§ 371 (c)(1),
(2) Date: Nov. 24, 2020

(87) PCT Pub. No.: WO2019/224739
PCT Pub. Date: Nov. 28, 2019

(65) Prior Publication Data
US 2021/0365761 A1    Nov. 25, 2021

(30) Foreign Application Priority Data
May 25, 2018    (ZA) ................................ 2018/03463

(51) Int. Cl.
G06Q 10/04    (2023.01)
G06N 20/20    (2019.01)
(Continued)

(52) U.S. Cl.
CPC ............ *G06Q 10/04* (2013.01); *G06F 17/18* (2013.01); *G06F 18/2178* (2023.01);
(Continued)

(58) Field of Classification Search
CPC .... G06Q 10/04; G06Q 10/0635; G06Q 50/06; G06F 17/18; G06F 18/2178;
(Continued)

(56) References Cited

U.S. PATENT DOCUMENTS

2008/0168011 A1    7/2008  Steinberg
2012/0150783 A1*   6/2012  Jung ...................... G05B 15/02
                                                      706/46
(Continued)

FOREIGN PATENT DOCUMENTS

CN            107622113 A        1/2018

OTHER PUBLICATIONS

International Search Report and Written Opinion Form PCT/ISA/210 and PCT/ISA237, International Application No. PCT/IB2019/054228, pp. 1-11, International Filing Date May 22, 2019, dated Nov. 1, 2019.
(Continued)

*Primary Examiner* — Shane D Woolwine

(57) ABSTRACT

The invention relates to a water level prediction system for a dam. The system includes a water level prediction module which is configured to (a) receive time series data, which relates to a water level of the dam, in real-time; and (b) predict, in real-time, a future water level of the dam by processing the received time series data in one or more predictive models/formula(s)/algorithm(s). The one or more predictive models/formula(s)/algorithm(s) may include a recurrent neural network (RNN) or RNN model/algorithm which is configured/trained to predict, in real-time, a future water level of the dam by using the received time series data (Continued)

in the RNN or RNN model/algorithm. The water level prediction module may also include at least one statistical model/algorithm which is configured/trained to predict, in real-time, a future water level of the dam by using the received time series data in the statistical model/algorithm.

19 Claims, 5 Drawing Sheets

(51) Int. Cl.

| | | |
|---|---|---|
| G06F 17/18 | (2006.01) | |
| G06N 3/04 | (2023.01) | |
| G06F 18/21 | (2023.01) | |
| G06N 3/044 | (2023.01) | |
| G06N 3/08 | (2023.01) | |
| G06N 5/01 | (2023.01) | |
| G06Q 10/0635 | (2023.01) | |
| G06Q 50/06 | (2012.01) | |

(52) U.S. Cl.
CPC ........... *G06F 18/2193* (2023.01); *G06N 3/04* (2013.01); *G06N 3/044* (2023.01); *G06N 3/08* (2013.01); *G06N 5/01* (2023.01); *G06N 20/20* (2019.01); *G06Q 10/0635* (2013.01); *G06Q 50/06* (2013.01)

(58) Field of Classification Search
CPC ...... G06F 18/2193; G06N 3/04; G06N 3/044; G06N 3/045; G06N 3/047; G06N 3/08; G06N 5/01; G06N 20/00; G06N 20/10; G06N 20/20
See application file for complete search history.

(56) References Cited

U.S. PATENT DOCUMENTS

| | | |
|---|---|---|
| 2016/0190981 A1 | 6/2016 | Hong et al. |
| 2016/0199215 A1 | 7/2016 | Kopelman |
| 2018/0003593 A1 | 1/2018 | Siegel et al. |
| 2018/0373993 A1* | 12/2018 | Petty .................. G06F 30/20 |

OTHER PUBLICATIONS

Veysel Guldal and Hakan Tongal, "Comparison of Recurrent Neural Network, Adaptive Neuro-Fuzzy Inference System and Stochastic Models in Egirdir Lake Level Forecasting", Water Resour Manage, 24, pp. 105-128, 2010.

Communication from the Canadian Patent Office, dated Jan. 13, 2021, pp. 1-4.

* cited by examiner

SYSTEM AND METHOD FOR REAL TIME PREDICTION OF WATER LEVEL AND HAZARD LEVEL OF A DAM

CROSS REFERENCE TO RELATED APPLICATIONS

This application is a U.S. National Phase filing of International Application No. PCT/IB2019/054228 filed May 22, 2019, which claims priority to South African Patent Application Serial No. 2018/03463, filed on May 25, 2018, the entirety of each of which is incorporated herein by reference.

BACKGROUND OF THE INVENTION

This invention relates to a water level prediction system and a hazard level prediction system for a dam. The invention further also relates to a method for predicting a water level or hazard level for a dam.

South Africa (SA) has an extensive infrastructure of dams [1]. Publications from the Water and Sanitation Department of SA show that in 2016, there were 5226 registered dams in the country [2]. Investment in such huge infrastructure is necessary as the country receives one of the least rainfalls in the world [3] and with abundant sunshine, it is able to hold very little water in its ground. Thus these dams are required for conserving water that can be used for industry, agriculture and domestic purposes.

Furthermore, as the larger dams are typically more than 30 years old, infrastructural integrity of the dams have to be ensured through adherence to a long list of safety regulations [4]. Safety regulation checks are done by approved professional persons (APPs). These APPs are mostly professionally certified engineers, technologists and technicians. One of the primary functions of these individuals is to regularly check the various parameters of the dams, and also classify its hazard level (as high, significant, or low).

Given the present shortage of technical skill in SA, these APPS are very few in number. One estimate shows that currently there are less than 100 APPs in SA. With such low number of APPs, safety inspection of dams is a challenge. By another statistics, due to the less number of APPs, in 2014-15, only 58% of the targeted numbers of dams could be inspected.

In the past, several studies have used various techniques to predict the water level of a dam. Statistical techniques such as Auto Regressive Moving Average(ARMA) [5] and Artificial Intelligence (AI) based approaches such as Feedforward Neural Networks based upon Back Propagation [6, 7, 8] have in the past been used to forecast a dam's water level.

However to the knowledge of the Inventors, none of the published works are based upon real time data extraction and subsequent prediction.

In addition, while Feed-forward Neural Networks based upon Back Propagation are able to predict outputs with a high level of accuracy, they are not able to capture the sense of lag period that is characteristic of time series data.

Some of the notable guidelines and reports in the area of dam hazard prediction/dam safety management are by the International Commission on Large Dams [9], the Australian National Committee on Large Dams [10] and the Canadian guidelines [11]. While these reports provide detailed instructions on various aspects of dam safety, their objective is to provide generic guidelines rather that deal with a specific aspect of predicting a dam's hazard in a supervised Machine Learning (ML) framework. In a work related to the present invention, Danso-Amoako et. al [12] uses a single hidden layer Artificial Neural Network with back propagation of error to predict a dam's risk (as a continuous value feature and hence a regression problem) with 40 features and 5000 data points.

The Inventors are however not aware of substantial work carried out in the supervised ML framework to create models that classify and hence predict the hazard potential of dams in real time.

The Inventors wishes to address at least some of the problems/issues mentioned above.

LIST OF REFERENCES

[1] National Water Act of South Africa (1998) (NATIONAL WATER ACT, Act No 36 of 1998. http://www.dwa.gov.za/Documents/Legislature/nw_act/NWA.pdf)
[2] Dam Safety Office, Dept. of Water and Sanitation—Republic of South Africa, http://www.dwaf.gov.za/DSO/Publications.aspx
[3] The World Bank, Average precipitation in depth (mm per year), World Bank, http://data.worldbank.org/indcator/AG.LND.PRCP.MM?end=2014&start=2010&year_high_desc=true
[4] Dam safety—ensuring the integrity of SA's 5000+ registered dams, South African Water Research Commission, http://www/wrc/org.za/Lists/Knowledge$\%$20Hub$\%$20Items/Attachments/11496/WW_Nov15_dam$\%$20safety.pdf
[5] Kaloop M, Rabah M, Elnabwy M. 2016. Sea level change analysis and models identification based on short tidal gauge measurements in Alexandria, Egypt. Mar Geod. 39:1$-$20. doi:10.1080/01490419.2015.1134735.
[6] Mahmood, Mustafa and Muhammed. 2012. "Application of Artificial Neural Networks to Forecast the Release Water from Haditha Dam", Special Issue of Engineering and Development Journal ISSN 1813-7822.
[7] Okoye N. and Igboanugo, A. C. 2013. "Predicting Water Levels at Kainji Dam using Artificial Neural Networks", http://citeseerx.ist.psu.edu/viewdoc/download?doi=10.1.1.856.9838&rep=rep1&type=pdf
[8] Ondimu S. and Murase H., 2007. "Reservoir Level Forecasting using Neural Networks: Lake Naivasha", Biosystems Engineering 96 (1), 135-138.
[9] Bowles D. S., Giuliani F. L., Hartford D. N. D. Janssen J. P. F. M., McGrath S., Poupart M., Stewart D. and Zielinski P. A., ICOLD Bulletin on Dam Safety Management, http://www.sgmconsulting.com.au/images/Dam_Safety_Management_Bulletin_ICOLD_2007.pdf
[10] ANCOLD (Australian National Committee on Large Dams Incorporated) Guidelines, https://www.ancold.org.au/?pageid=334.
[11] Hartford, DND., Baecher, G B. 2004. Risk and Uncertainty in Dam Safety. Inst of Civil Engineers Pub, ISBN-13:978-0727736390.
[12] Danso-Amoako, E., Scholz, M., Kalimeris, N., Yang, Q., Shao, J. 2012. Predicting dam failure risk for sustainable flood retention basins: A generic case study for the wider Greater Manchester area. In: Computers, Environment and Urban Systems, pp. 423-433. Vol 36.

SUMMARY OF THE INVENTION

In accordance with a first aspect of the invention there is provided a water level prediction system for a dam, wherein the system includes:

a water level prediction module which is configured to
  receive time series data, which relates to a water level of the dam, in real-time;
  predict, in real-time, a future water level of the dam by processing the received time series data in one or more predictive models/formula(s)/algorithm(s).

A "module", in the context of the specification, includes an identifiable portion of code, computational or executable instructions, or a computational object to achieve a particular function, operation, processing, or procedure. A module may be implemented in software, hardware or a combination of software and hardware. Furthermore, modules need not necessarily be consolidated into one device.

At least one of the predictive model(s)/formula(s)/algorithm(s) may be based on artificial intelligence (AI). In other words, one of the predictive models/formula(s)/algorithm(s) may be an AI-based model/formula/ algorithm. The one or more predictive models/formula(s)/algorithm(s) may include a recurrent neural network (RNN) or RNN model/algorithm which is configured/trained to predict, in real-time, a future water level of the dam by using the received time series data in the RNN or RNN model/algorithm. The RRN model/algorithm may be the AI-based model/algorithm.

The water level prediction module may include at least one statistical model/algorithm which is configured/trained to predict, in real-time, a future water level of the dam by using the received time series data in the statistical model/algorithm. The statistical model/algorithm may be an Autoregressive Integrated Moving Average (ARIMA) model/algorithm. Alternatively, the statistical model/algorithm may be an Exponential Smoothing model/algorithm. Preferably the water level prediction module may include two prediction models//algorithms. The two models/algorithms may be an ARIMA model/algorithm and an ETS (Error Trend Seasonality) model/algorithm.

The water level prediction module may include a recurrent neural network (RNN)/RNN model/algorithm and at least one statistical model/algorithm which are each configured/trained to predict the future water level of the dam by using the received time series data. Preferably, the water level prediction module may include the recurrent neural network (RNN) or RNN model/algorithm, ARIMA model/algorithm and an ETS model/algorithm which are each configured/trained to predict the future water level of the dam by using the received time series data.

The water level prediction module may be configured to calculate a MAPE (Mean Absolute Percentage Error) of each model/algorithm. The water level prediction module may be configured to identify the model/algorithm with the lowest/lesser MAPE value and use it to predict the future water level of the dam.

Preferably, the water level prediction module may be configured to
  calculate the MAPE for the AI-based model/algorithm;
  calculate the MAPE for the ARIMA model/algorithm;
  calculate the MAPE for the ETS model/algorithm; and
  identify the model/algorithm with the lowest MAPE value and use it to predict the future water level of the dam.

In one example, the water level prediction module may be configured to calculate the MAPE for only two of the above-listed models/algorithms and then identify the model/algorithm with the lowest MAPE value to thereby use it to predict the future water level of the dam.

The system may include a first communication module which is configured to receive the time series data via a communication network, preferably a mobile telecommunication network.

The system may include:
  a water level detection arrangement which is configured to measure the water level of the dam; and
  a second communication module which is configured to send time series data on the water level measured by the water level detection arrangement to the water level prediction module in real time.

More specifically, the second communication module may be configured to send time series data to the first communication module via a mobile telecommunication network (e.g. over a GSM network) in real time.

The water level detection arrangement may be located at/proximate the dam in order to thereby allow it to measure the water level of the dam. The water level prediction module may therefore be located remote from the water level detection arrangement.

The water level detection arrangement may include at least one ultrasonic sensor which is configured to measure the water level of the dam.

The water level prediction module may be implemented by a web server. The web server may be remote from the water level detection arrangement and be in communication therewith via a mobile telecommunication network.

The water level detection arrangement may be configured to take a plurality of water level measurements/readings over a period of time and calculate an average water level measurement therefor. In other words, the plurality of water level measurements are averaged. For example, 60 measurements/readings are taken with an interval of 1 second. This averaged measurement may take place at regular intervals (e.g. every 15 minutes). The water level detection arrangement may therefore be configured to send an averaged water level measurement at regular intervals over a period of time.

The system may include a hazard level prediction module which is configured to predict a hazard level of the dam, wherein the hazard level prediction module is configured to, in real-time:
  calculate/determine the accuracy/performance of two or more decision tree learning models for predicting the hazard level of the dam; and
  predict the hazard level of the dam by using the tree learning model with the best accuracy/performance.

The two or more decision tree learning models may, more specifically, be tree-based artificial intelligence (AI) models.

The two or more decision tree learning models may include at least one single decision tree and/or at least one ensemble decision tree, such as C5.0, Tree bootstrapping, Random forest, etc. The decision trees may each include decision rules for classifying the hazard level of the dam. Each decision tree may be configured to take the following as inputs/features:
  dam characteristics, such as wall height, crest length, surface area, etc.
  historical data on dam hazard levels;
  historical data related to the water level of the dam; and/or
  the predicted future water level of the dam.

The hazard level prediction module may be configured to calculate/determine the accuracy/performance of the two or more decision tree learning models by evaluating them through one or more metrics, such as confusion matrix, sensitivity and specificity (of each hazard level), Cohen's Kappa score, etc. The hazard level prediction module may be configured to evaluate the two or more decision tree learning models through one or more metrics for each hazard level.

The hazard level prediction module may be configured to train the decision tree learning models by using historical data related to the water level of the dam.

In accordance with a second aspect of the invention there is provided a hazard level prediction system for a dam, wherein the system includes:
a hazard level prediction module which is configured to, in real-time
receive time series data, which relates to a water level of the dam, in real-time;
use the time series data along with other dam characteristic features as inputs to two or more decision tree learning models;
calculate/determine the accuracy/performance of the two or more decision tree learning models for predicting the hazard level of the dam; and
predict the hazard level of the dam by using the received time series data in the tree learning model with the best accuracy/performance.

The two or more decision tree learning models may, more specifically, be tree-based artificial intelligence (AI) models.

The two or more decision tree learning models may include at least one single decision tree and/or at least one ensemble decision tree, such as C5.0, Tree bootstrapping, Random forest, etc. The decision trees may each include decision rules for classifying the hazard level of the dam. Each decision tree may be configured to take the following as inputs:
dam characteristics, such as wall height, crest length, surface area, etc.;
historical data related to the water level of the dam; and
a predicted future water level of the dam.

The hazard level prediction module may be configured to calculate/determine the accuracy/performance of the two or more decision tree learning models by evaluating them through one or more metrics, such as confusion matrix, sensitivity and specificity (of each hazard level), Cohen's Kappa score, etc. The hazard level prediction module may be configured to evaluate the two or more decision tree learning models through one or more metrics for each hazard level.

The hazard level prediction module may be configured to train the decision tree learning models by using historical data related to the water level of the dam.

In accordance with a third aspect of the invention there is provided a method of predicting the water level for a dam, wherein the method includes:
receiving time series data, which relates to a water level of the dam, in real-time, via a communication network;
predicting, by using a processor, in real-time, a future water level of the dam by utilising the received time series data in one or more predictive models/formula(s)/algorithm(s).

The one or more predictive models/formula(s)/algorithm(s) may include a recurrent neural network (RNN) model/algorithm which is configured/trained to predict, in real-time, a future water level of the dam by using the received time series data in the RNN model/algorithm.

The one or more predictive models/formula(s)/algorithm(s) may include at least one statistical model/algorithm which is configured to predict, in real-time, a future water level of the dam by using the received time series data in the statistical model/algorithm. The statistical model/algorithm may be an ARIMA (Autoregressive Integrated Moving Average) model/algorithm, Alternatively, the statistical model/algorithm may be an ETS (Error Trend Seasonality) model/algorithm.

Preferably, the predicting step may include using two prediction models//algorithms. The two models/algorithms may be an ARIMA model/algorithm and an ETS model/algorithm.

The predicting step may include using a recurrent neural network (RNN) model/algorithm and at least one statistical model/algorithm which are each configured/trained to predict the future water level of the dam by using the received time series data.

Preferably, the predicting step includes using the recurrent neural network (RNN)/RNN model/algorithm, ARIMA model/algorithm and an ETS model/algorithm which are each configured/trained to predict the future water level of the dam by using the received time series data.

The method may include
calculating, using a processor, a MAPE (Mean Absolute Percentage Error) of each model/algorithm;
identifying the model/algorithm with the lowest/lesser MAPE value;
using the model/algorithm with the lowest/lesser MAPE value to predict the future water level of the dam.

Preferably, the method may include:
calculating, using a processor, the MAPE for each of the recurrent neural network (RNN) or RNN model/algorithm, the ARIMA model/algorithm and the ETS model/algorithm;
identifying the model/algorithm with the lowest/lesser MAPE value; and
using the model/algorithm with the lowest/lesser MAPE value to predict the future water level of the dam.

The receiving step may include receiving the time series data via a mobile communication network. More specifically, the receiving step includes receiving the time series data via the mobile communication network from a water level detection arrangement which is configured to measure the water level of the dam.

In accordance with a fourth aspect of the invention there is provided a method of predicting a hazard level for a dam, wherein the method includes, in real-time:
receiving time series data, which relates to a water level of the dam, in real-time, via a communication network;
calculating/determining, by using a processor, the accuracy/performance of two or more decision tree learning models for predicting the hazard level of the dam; and
predicting, using a processor, the hazard level of the dam by inserting the time series data into the tree learning model with the best accuracy/performance.

The two or more decision tree learning models may, more specifically, be tree-based artificial intelligence (AI) models.

The two or more decision tree learning models may include at least one single decision tree and/or at least one ensemble decision tree, such as C5.0, Tree bootstrapping, Random forest, etc. The decision trees may each include decision rules for classifying the hazard level of the dam. Each decision tree may be configured to take the following as inputs:
dam characteristics, such as wall height, crest length, surface area, etc.;
historical data related to the water level of the dam; and/or the predicted future water level of the dam.

The calculating/determining step may include calculating/determining the accuracy/performance of the two or more decision tree learning models by evaluating them through one or more metrics, such as a confusion matrix, sensitivity and specificity (of each hazard level), Cohen's Kappa score, etc.

The method may include training the decision tree learning models by using historical data related to the water level of the dam.

In accordance with a fifth aspect of the invention there is provided a non-transitory computer readable storage medium which includes computer-readable instructions which, when executed by a computer/processor, performs the following steps:
receive time series data, which relates to a water level of the dam, in real-time via a communication network; and
predict, in real-time, a future water level of the dam by using the received time series data in one or more predictive models/formula(s)/algorithm(s).

The computer-readable instructions, when executed by a computer/processor, may be configured to implement the method(s) in accordance with the third and/or fourth aspects of the invention.

In accordance with a sixth aspect of the invention there is provided a non-transitory computer readable storage medium which includes computer-readable instructions which, when executed by a computer/processor, performs the following steps:
receive time series data, which relates to a water level of a dam, in real-time, via a communication network;
calculate/determine, by using a processor, the accuracy/performance of two or more decision tree learning models for predicting the hazard level of the dam; and
predict the hazard level of the dam by inserting the time series data into the tree learning model with the best accuracy/performance.

BRIEF DESCRIPTION OF THE DRAWINGS

The invention will now be described, by way of example, with reference to the accompanying diagrammatic drawings. In the drawings.

DESCRIPTION OF PREFERRED EMBODIMENTS

Figure 1:
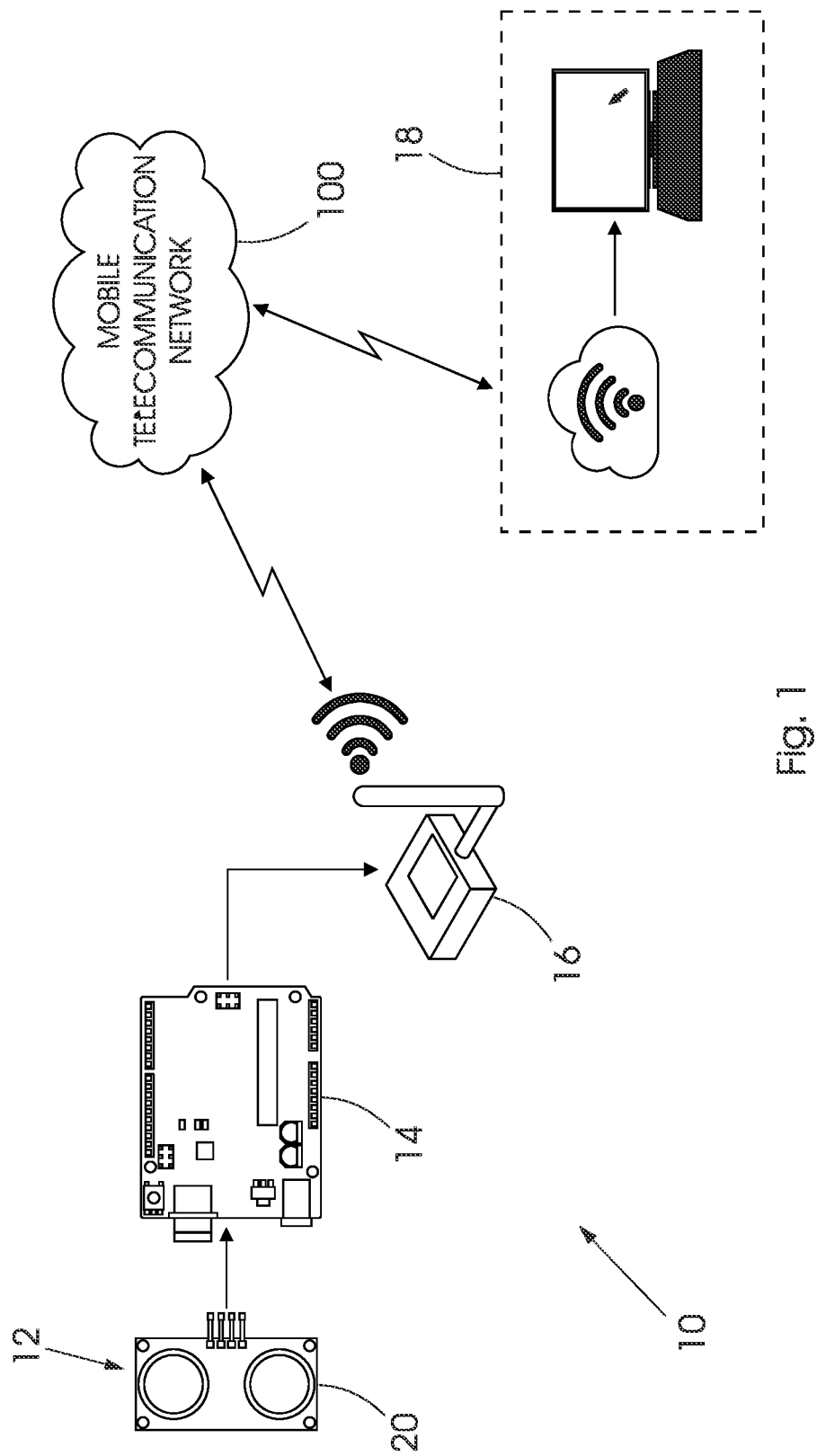
FIG. 1 shows a schematic layout of a system and its components in accordance with the invention.

The system in accordance with the invention captures a dam's water level at regular intervals using devices which are connected to a server/processor via a network. The devices are typically water level detection arrangements which are configured to capture time series data related to the water level of a dam and send it in real-time to the server for storing and further processing.

The received time series data is used by the server/processor, through suitable software, to forecast in real time, the future water level of a dam using two families of time series models. Considering large fluctuations in the mean and variance due to (multiple) seasonality and trend in the data, two families of algorithms are compared to get the best results. They are the conventional statistical time series (Auto Regressive Integrated Moving Average and Exponential Smoothing) algorithms and the neural network (Recurrent Neural Network) based algorithms. The forecasts (for a considerable time window) can help APPs in reviewing safety protocols of the concerned dam and take precautionary steps, if any are required.

Using available historical data, single and ensemble supervised decision tree based Artificial Intelligence (AI) models are next developed. The historical data can be obtained from the Dam Safety Office, Dept. of Water and Sanitation—Republic of South Africa, http://www.d-waf.gov.za/DSO/Publications.aspx. At present 5227 rows of such historical data is available from the Dam Safety Office.

The AI model takes inputs such as the basic characteristics of the dam (e.g. its wall height, crest length, surface area, water management area, quaternary drainage area, spillway type, catchment area, and various other information related to the geographical location) as inputs into the model. The model then predicts a dam hazard level by creating classification rules on each decision node within the tree model(s). The historical data from the Department of Water and Sanitation classifies its dam hazard levels into three distinct classes and not as a continuous value feature. There are typically three hazard levels, namely high, significant, and low. It will however be appreciated that the number of levels may differ.

The implementation of the models mentioned above is described in more detail later on in the specification.

In the drawings, reference numeral 10 refers generally to a system in accordance with the invention. The system 10 includes a water level detection arrangement 12, a processor 14 which is connected to the arrangement 12, a communication module 16 which is connected to the processor 14 and a remote server 18.

The arrangement 12, processor/microcontroller 14 and communication module 16 are typically located at a dam which water level needs to be measured/analysed and can, in one example, be provided/arranged in a single device and therefore be a modular unit. Alternatively, the arrangement 12, processor/microcontroller 14 and communication module 16 can be separate units and merely be connected to one another via a communication link/line/network.

The water level detection arrangement 12 includes an ultrasonic sensor 20 (e.g. HC-SR04 sensor) which is configured to measure the water level of the dam. More specifically, the sensor 20 is located above a portion of the dam and directed downwardly such that it can measure the water level of the dam. In use, ultrasound emitted by the sensor 20 is used to measure the distance (since speed of sound and its travel time is known) between it and the level of water in the dam. Due to the specific nature of each dam and a convenient height at which the sensor 20 has to be placed, each sensor 20 has to be specifically placed and calibrated to measure the water level.

Figure 2:
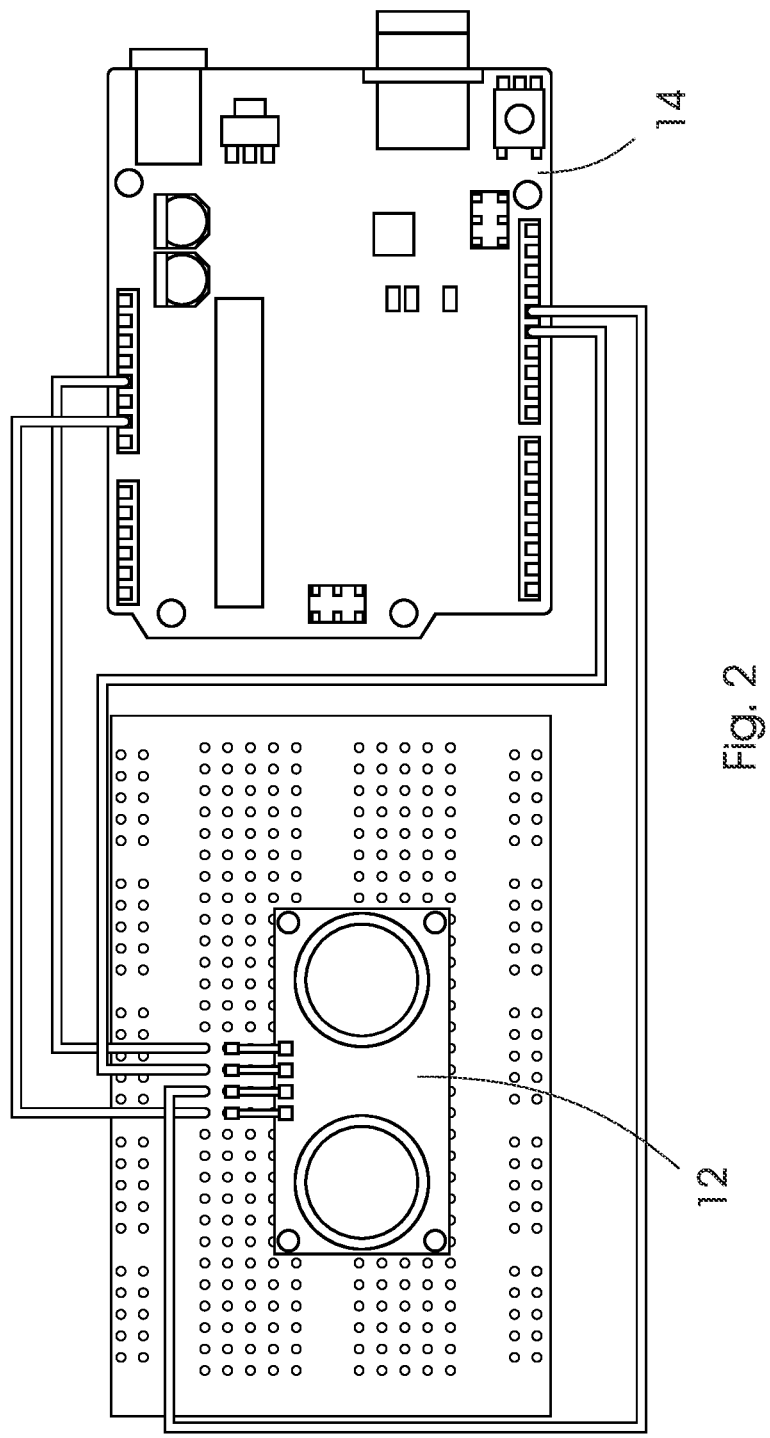
FIG. 2 shows a circuit layout of the pin connection between a sensor and a controller/processor of the system.

The microcontroller 14 may be a single board microcontroller (e.g. an Arduino Uno—ATmega328). FIG. 2 shows the pin connections between the microcontroller 14 and the sensor 22. The microcontroller 14 typically receives the readings/measurements obtained from the sensor 20 and calculates an average reading over a period of time. For example, the microcontroller 14 can be configured to take 60 readings with an interval of one second and calculate an average of these readings to provide an indication of the water level of the dam. The averaging is done to help reduce the effect of ripple and hence minimize measurement error. This process is typically repeated every 15 minutes in order to obtain time series data regarding the water level of the dam.

Figure 3:
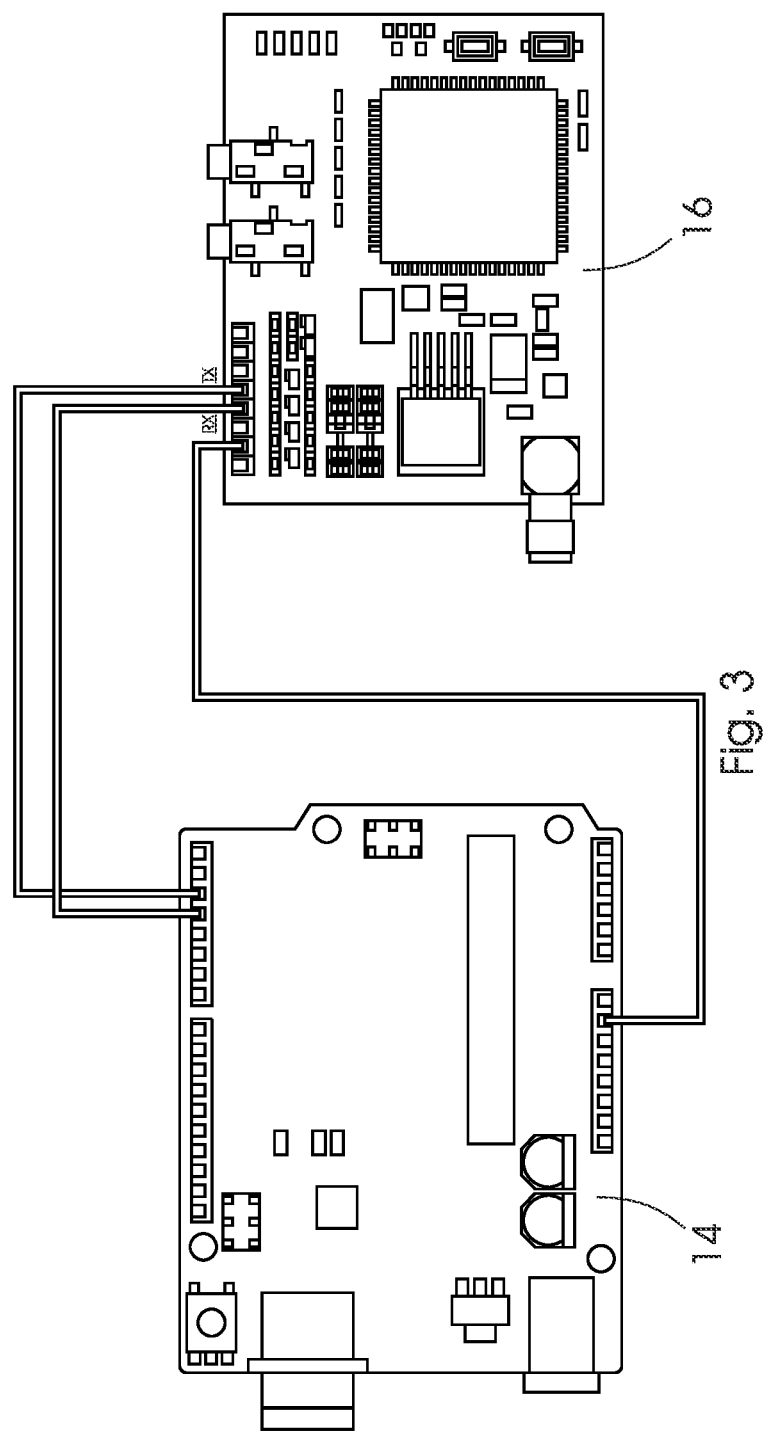
FIG. 3 shows a circuit layout of the pin connection between the controller/processor and a GSM module of the system.

A communication module 16 is typically configured to communicate via a mobile telecommunication network 100. In one example the communication module 16 may be a GSM module 16 (e.g. SIM900A). The time series data obtained by the microcontroller 14 may therefore be sent, using the communication module 16, to the remote server 18 via a GSM network. In this example, the GSM module 16 may typically include a GSM Sim card for allowing it to utilise the GSM network. FIG. 3 shows the pin connections between an Arduino microcontroller 14 and the GSM module 16.

The SIM900A delivers GSM/GPRS 900/1800 MHz performance for voice, SMS and Data in a small form factor and with low power consumption. The time series data from the microcontroller 14 will then be sent to the server 18 by calling a particular address assigned to each water level detection arrangement 12 (i.e. each node). This will then be stored by the server 18 for further analysis (e.g. on a cloud database). The server 18 can typically be a secure web server and include a communication module 35 for communicating with the microcontroller 14. The server 18 has a cloud-based infrastructure which is configured to store the received data on a cloud-based database. In one example, the data can be stored in SQL format.

The system 10 includes software, which is typically executed by the server 18, which is configured to implement a number of AI algorithms in order to analyse the received data. The software is also configured to provide a user interface/dashboard which provides a visual representation of the output of the algorithms.

Once the received time series data is stored in the cloud (i.e. a cloud-based database), it is further analysed using AI algorithms.

The algorithms are typically implemented in such a fashion in order to:
predict/forecast a future water level of the dam, using its past time series data; and
use the predicted/forecasted water level in combination with other parameters of the dam (described later on) in a supervised machine learning setup to predict a hazard level of the dam.

Predicting Future Water Level

The software is configured to provide a water level prediction module 31 which utilizes two varieties of algorithms, namely (i) statistical algorithms (e.g. ARIMA (Autoregressive Integrated Moving Average) algorithm(s) and ETS (Error Trend Seasonality) algorithms) and (ii) a RNN (Recurrent Neural Network)/RNN algorithm(s).

The Mean Absolute Percentage Error (MAPE) of the algorithms is considered. Calculated in percentage terms, MAPE is average on the ratio between the difference (between the actual and predicted values) and the actual values. The algorithm with the lesser MAPE value is chosen by the software as the algorithm that is best fitted for future forecasts.

In the past, several studies have used various techniques to predict the water level of a dam. Statistical techniques such as Auto Regressive Moving Average [5] and AI based approaches such as Feed-forward Neural Networks based upon Back Propagation [6, 7, 8] have in the past been used to forecast a dam's water level. However, as mentioned in the background of the invention, none of the published works are based upon real time data extraction and subsequent prediction.

In addition, while Feed-forward Neural Networks based upon Back Propagation are able to predict outputs with a high level of accuracy, they are not able to capture the sense of lag period that is characteristic of a time series data. The present invention therefore implements a recurrent neural network (in software) whose architecture (with an inbuilt delay unit) is able to predict output with better accuracy in case of time series data.

Since the software of the water level prediction module 31 is configured to, in real-time (a) calculate and compare the MAPE values of ARIMA, ETS and RNN algorithms and (b) select the algorithm whose MAPE value is lowest as the best algorithm to be used for the prediction, the invention automatically provides the best possible forecast values (from the three algorithms mentioned above) in real time.

Figure 4:
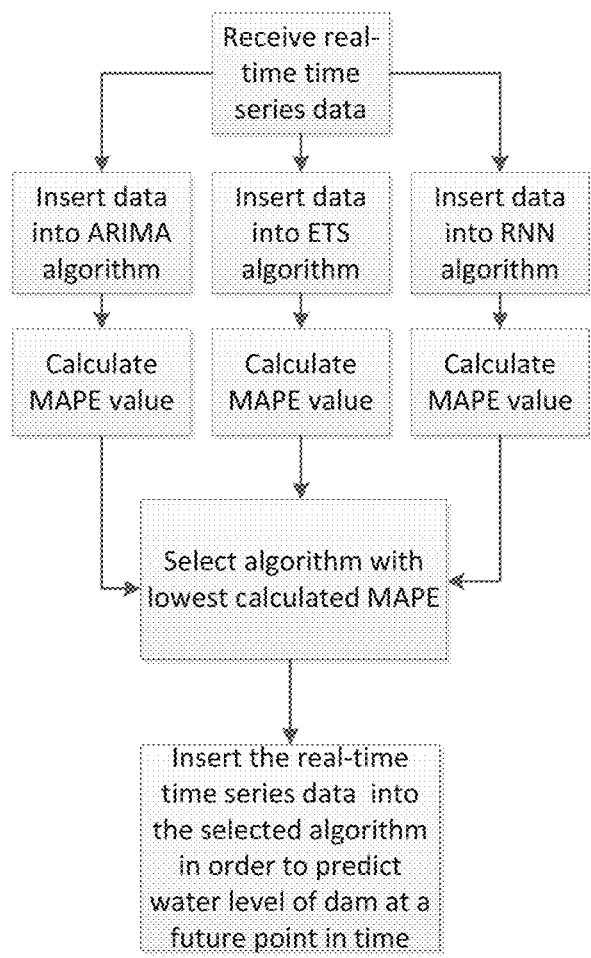
FIG. 4 shows a simplified flow diagram of how a water level prediction module of the system of FIG. 1 operates.

The prediction process is set out in the flow-diagram illustrated in FIG. 4.

Predicting Hazard Level of Dam

For this prediction part, the software is also configured to implement a hazard level prediction module 33 which uses various single and ensemble decision trees (such as C5.0, Tree bootstrapping, Random forest, and boosted decision trees) to create decision rules that can classify a dam into its three levels of hazards (High, Significant and Low). As mentioned other types/numbers of levels could also be used. The training samples of such data are obtained from historical data. The historical data may, for example, be obtained from the Dam Safety Office, SA or another office (e.g. the historical data may be stored on a database which can be accessed). The data consists of the basic characteristics of the dam, such as its wall height, crest length, surface area, water management area, quaternary drainage area, spillway type, catchment area, and various other information related to the geographical location. This data is then used in order to train each of the decision trees.

In order to select the best tree model for a particular real-time hazard level prediction, the accuracy of the various decision tree models are evaluated. In order to do so, the software (the hazard level prediction module 33) is configured to evaluate the accuracy of each tree model by using performance metrics, such as a confusion matrix, sensitivity and specificity (of each hazard level), Cohen's Kappa score, etc. The model that gives the best score is accepted and used for the hazard level prediction.

The Inventors are not specifically aware of previous, in-depth development carried out in the supervised learning framework to create models that classify and hence predict the hazard potential of dams. The present invention is configured to compare various single and ensemble decision tree algorithms (substantially simultaneously) (in terms of various performance metrics such as confusion matrix, sensitivity and specificity (of each hazard level), Cohen's Kappa score, etc.) on a real time basis in order to provide the best decision tree algorithm. The best decision tree algorithm in turn predicts the appropriate hazard level of a dam. A confusion matrix is a table that describes the performance of a classification model on a set of test data for which the true values are known. Sensitivity measures the proportion of positives that are correctly identified. Specificity measures the proportion of negatives that are correctly identified. Kappa measures the percentage of data values in the main diagonal of the table and then adjusts these values for the amount of agreement that could be expected due to chance alone.

The software is also configured to provide a user interface (e.g. developed using R and Shiny software, used together with open source deep learning libraries based upon Keras and H2O). The user interface typically displays the predicted water and hazard levels of the dam.

Figure 5:
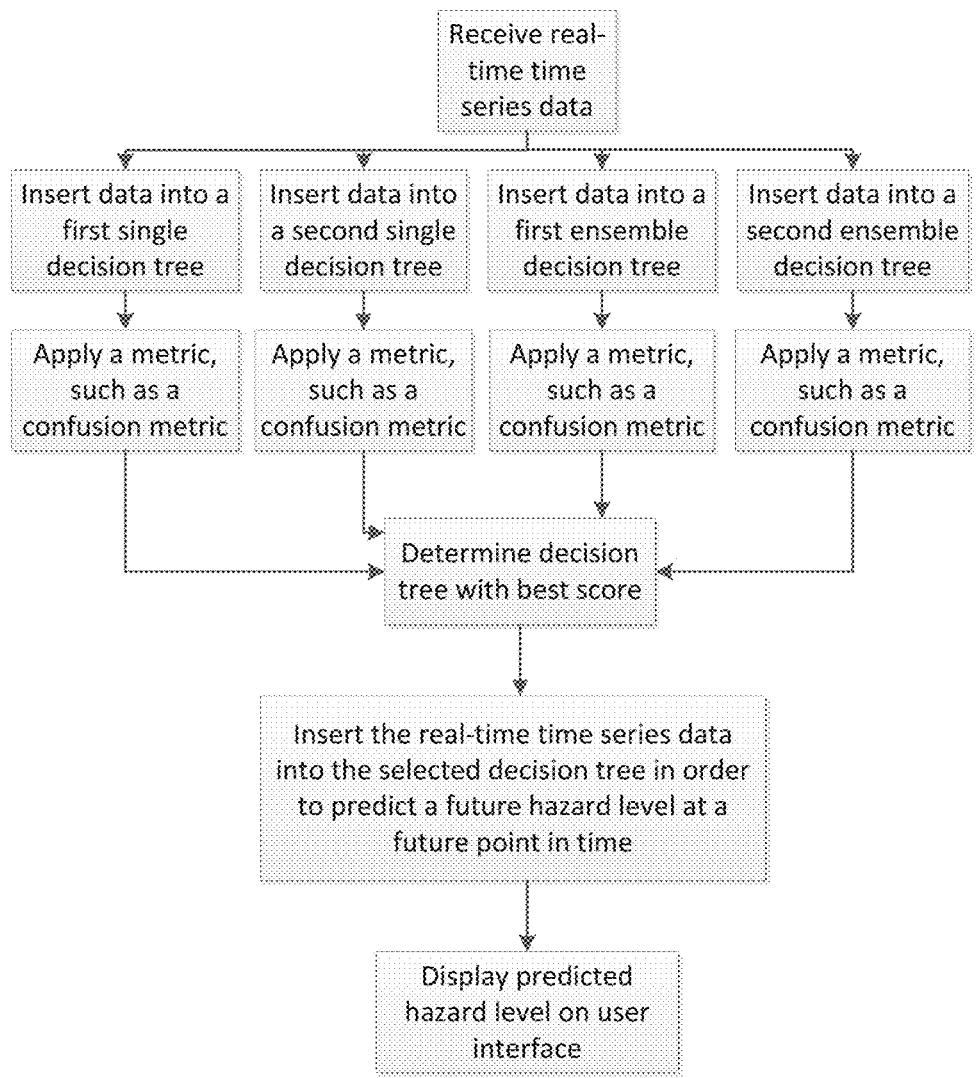
FIG. 5 shows a simplified flow diagram of how a hazard level prediction module of the system of FIG. 1 operates.
Figure 6:
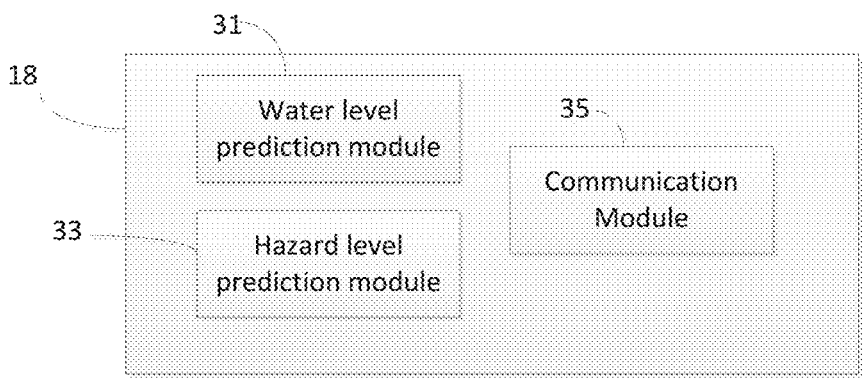
FIG. 6 shows a schematic layout of a server of the system of FIG. 1.

The hazard level prediction process is set out in the flow-diagram illustrated in FIG. 5.

The Inventors believe that the system 10 in accordance with the invention provides an effective way of predicting the future water level and hazard level of a dam in real time. The algorithms, training and suitable algorithm selections implemented by the system 10 also helps to provide more accurate predictions.

What is claimed is:

1. A water level prediction system for a dam, wherein the system includes: a water level prediction module which is configured to receive time series data, which relates to a water level of the dam, in real-time, and wherein the water level prediction module includes: a recurrent neural network (RNN) or RNN model/algorithm which is configured/trained to predict, in real-time, a future water level of the dam by using the received time series data in the RNN or RNN model/algorithm; and at least one statistical model or statistical algorithm which is configured or trained to predict in real-time a future water level of the dam by using the receiving time series data in the statistical model or statistical algorithm, wherein the water level prediction module is configured to: calculate a MAPE (Mean Absolute Percentage Error) of each of the (i) recurrent neural network (RNN) or RNN model or RNN algorithm and (ii) the statistical model or statistical algorithm, and identify the network, model or algorithm with the lowest MAPE value and use it to predict the future water level of the dam.

2. The system of claim 1, wherein the statistical model or statistical algorithm is an Autoregressive Integrated Moving Average (ARIMA) model or algorithm.

3. The system of claim 2, wherein the water level prediction module includes an ETS (Error Trend Seasonality) model or ETS algorithm.

4. The system of claim 1, wherein the system includes a first communication module which is configured to receive the time series data via a communication network.

5. The system of claim 4, wherein the communication network is a mobile telecommunication network.

6. The system of claim 5, which includes: a water level detection arrangement which is configured to measure the water level of the dam; and a second communication module which is configured to send time series data on the water level measured by the water level detection arrangement, in real time, to the first communication module via a mobile telecommunication network.

7. The system of claim 6, wherein the water level detection arrangement is located at or proximate the dam in order to thereby allow it to measure the water level of the dam, and wherein the water level prediction module is located remote from the water level detection arrangement.

8. The system of claim 7, wherein the water level detection arrangement includes at least one ultrasonic sensor which is configured to measure the water level of the dam.

9. The system of claim 7, wherein the water level detection arrangement is configured to take a plurality of water level measurements/readings over a period of time and calculate an average water level measurement therefor.

10. The system of claim 1, which includes a hazard level prediction module which is configured to predict a hazard level of the dam, wherein the hazard level prediction module is configured to, in real-time: calculate/determine the accuracy or performance of two or more decision tree learning models for predicting the hazard level of the dam; and predict the hazard level of the dam by using the tree learning model with the best accuracy or performance.

11. The system of claim 10, wherein the two or more decision tree learning models are tree-based artificial intelligence (AI) models.

12. The system of claim 11, wherein the two or more decision tree learning models include at least one single decision tree and at least one ensemble decision tree.

13. The system of claim 11, wherein each decision tree is configured to take the following as inputs or features: dam characteristics; historical data on dam hazard levels; historical data related to the water level of the dam; and/or the predicted future water level of the dam.

14. The system of claim 11, wherein the hazard level prediction module is configured to calculate/determine the accuracy or performance of the two or more decision tree learning models by evaluating them through one or more metrics, wherein the metrics can be selected from a confusion matrix, sensitivity and specificity of each hazard level and Cohen's Kappa score.

15. The system of claim 11, wherein the hazard level prediction module is configured to train the decision tree learning models by using historical data related to the water level of the dam.

16. A method of predicting the water level for a dam, wherein the method includes: receiving time series data, which relates to a water level of the dam, in real-time, via a communication network; and predicting, by using a processor, in real-time, a future water level of the dam by using a (i) a recurrent neural network (RNN), RNN model or RNN algorithm, and (ii) at least one statistical model or statistical algorithm, which are configured/trained to predict the future water level of the dam by using the received time series data.

17. The method of claim 16, wherein the statistical model/algorithm is an ARIMA (Autoregressive Integrated Moving Average)model/algorithm.

18. The method of claim 16, wherein the method includes: calculating, using a processor, a MAPE (Mean Absolute Percentage Error) of each model or algorithm; identifying the model or algorithm with the lowest MAPE value; and using the model or algorithm with the lowest MAPE value to predict the future water level of the dam.

19. A non-transitory computer readable storage medium which includes computer-readable instructions which, when executed by a computer/processor, performs the method of claim 16.

* * * * *